United States Patent [19]

Dore

[11] 4,005,067
[45] Jan. 25, 1977

[54] PROCESS FOR THE SYNTHESIS OF NITRITE ION-CONTAINING 1:1 COMPLEXES OF COBALT AND METALLIZABLE MONOAZO OR AZOMETHINE COMPOUNDS AND SUCH COMPLEXES

[75] Inventor: Jacky Dore, Basel, Switzerland
[73] Assignee: Sandoz Ltd., Basel, Switzerland
[22] Filed: June 2, 1975
[21] Appl. No.: 583,335

Related U.S. Application Data

[63] Continuation-in-part of Ser. Nos. 189,767, Oct. 15, 1971, abandoned, and Ser. No. 533,521, Dec. 17, 1974, which is a continuation-in-part of Ser. No. 189,768, Oct. 15, 1971, abandoned.

[30] Foreign Application Priority Data

| Oct. 28, 1970 | Switzerland | 15925/70 |
| June 11, 1971 | Switzerland | 8519/71 |
| June 23, 1971 | Switzerland | 9173/71 |

[52] U.S. Cl. .............. 260/151; 260/147; 260/149; 260/150; 260/566 F
[51] Int. Cl.² .............. C07C 119/00; C07C 131/00; C09B 45/10; C09B 45/20
[58] Field of Search ........... 260/145 A, 145 B, 147, 260/148, 149, 150, 151, 566 D, 566 F

[56] References Cited

UNITED STATES PATENTS

| 2,778,816 | 1/1957 | Buehler et al. | 260/145 A |
| 2,871,232 | 1/1959 | Csendes | 260/147 |
| 2,906,746 | 9/1959 | Brassel et al. | 260/145 A |
| 3,005,813 | 10/1961 | Brassel et al. | 260/145 A |
| 3,040,019 | 6/1962 | Neier | 260/145 A |
| 3,169,123 | 2/1965 | Neier | 260/145 A |
| 3,185,676 | 5/1965 | Klein | 260/145 A |
| 3,203,948 | 8/1965 | Neier | 260/145 A |
| 3,221,003 | 11/1965 | Scholl et al. | 260/145 A |
| 3,516,979 | 6/1970 | Dore et al. | 260/145 A |
| 3,516,980 | 6/1970 | Dore et al. | 260/145 A |
| 3,526,617 | 9/1970 | Fuchs et al. | 260/145 A |
| 3,876,625 | 4/1975 | Wittwer | 260/147 |

FOREIGN PATENTS OR APPLICATIONS

| 1,085,262 | 1/1955 | France | 260/145 A |
| 1,092,850 | 4/1955 | France | 260/145 A |
| 1,115,426 | 4/1956 | France | 260/145 A |
| 1,431,264 | 8/1969 | France | 260/145 A |
| 1,466,877 | 1/1970 | France | 260/145 A |
| 1,476,587 | 2/1970 | France | 260/145 A |
| 2,153,548 | 5/1972 | Germany | 260/151 |
| 1,094,746 | 12/1967 | United Kingdom | 260/151 |

OTHER PUBLICATIONS

Venkataraman, "The Chemistry of Synthetic Dyes," vol. III, pp. 303–373 (1970).
Merck Index, 7th Edition, p. 957 (1960).

*Primary Examiner*—Floyd D. Higel
*Attorney, Agent, or Firm*—Gerald D. Sharkin; Richard E. Vila; Melvyn M. Kassenoff

[57] ABSTRACT

By metallization of metallizable monoazo or azomethine dyes with cobalt-donating compounds in the presence of a nitrite, especially NaNO$_2$, 1:1 cobalt complexes containing a nitrite ion are obtained in a high degree of metallization which can be reacted with metallizable monoazo or azomethine dyes to give very homogeneous 2:1 cobalt complexes in a high degree of purity. This is particularly advantageous when asymmetrical 2:1 cobalt complexes are to be prepared. The process is particularly useful for the preparation of nitrite ion-containing 1:1 complexes of cobalt and a monoazo compound of the formula

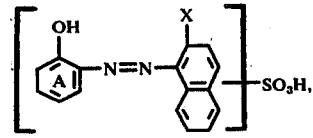

wherein
X is —OH or —NHR,
 wherein R is hydrogen or a substituted or unsubstituted alkyl, cycloalkyl, phenyl or naphthyl group,
Ring A is further unsubstituted or further substituted by at least one halo, nitro or optionally substituted alkyl, alkoxy or sulfamoyl substituent, and
the naphthalene ring is further unsubstituted or further substituted by at least one hydroxy, sulfamoyl or acylamino substituent.

27 Claims, No Drawings

PROCESS FOR THE SYNTHESIS OF NITRITE ION-CONTAINING 1:1 COMPLEXES OF COBALT AND METALLIZABLE MONOAZO OR AZOMETHINE COMPOUNDS AND SUCH COMPLEXES

This application is a continuation-in-part of application Ser. No. 189,767, filed on Oct. 15, 1971 and now abandoned and a continuation-in-part of application Ser. No. 533,521, filed on Dec. 17, 1974, which is a continuation-in-part of application Ser. No. 189,768, filed on Oct. 15, 1971 and now abandoned.

In the known processes for the production of 1:1 cobalt complex compounds of metallisable monoazo and azomethine dyes, cobalt complexes are formed in which the three coordination valences not occupied by the metallisable monoazo or azomethine dye are saturated with ammonia, primary, secondary or tertiary amines and in some cases $H_2O$ as the compounds are synthesised in the presence of these amines or ammonia.

The resulting 1:1 cobalt complex compounds are considerably contaminated with by-products since the yield of these metallisation reactions is not particularly high. It is however important that 1:1 cobalt complex compounds should be obtained in high purity, particularly because they can then be reacted further to give 2:1 cobalt complex compounds of similar high purity, without requiring the use of difficult methods of intermediate purification.

It has now been found that 1:1 cobalt complex compounds of known metallisable azomethine and monoazo compounds can be produced in high purity when they are reacted with the selected cobalt donor in the presence of nitrites.

This invention therefore relates to a process for the production of 1:1 cobalt complex compounds of known metallisable monoazo and azomethine compounds by reaction of the metallisable monoazo and azomethine compounds with cobalt compounds, the distinctive feature of the process being that the reaction is carried out in the presence of a nitrite. The resulting 1:1 cobalt complexes contain one to two nitrite ions (analysis showing generally on average 1.2 to 1.5 nitrite ions) bound to the cobalt atom which is in the +3 oxidation state.

The metallisable monoazo and azomethine compounds are understood to be such as bear metallisable radicals in the positions ortho and ortho' to an azo or an azomethine group. This does not however preclude the presence of further azo and/or azomethine groups which contain no metallisable radicals in ortho position.

In the process of this invention it is preferable to react monoazo dyes which may contain one sulphonic acid group. These dyes bear, e.g., two hydroxyl groups in the positions ortho and ortho' to the azo group, or one hydroxyl group in ortho position to the azo group and one alkoxy group in ortho' position to the azo group, or one hydroxyl group in ortho position to the azo group and one amino group in ortho' position to the azo group, or one hydroxyl group in ortho position and one carboxyl group in ortho' position. Preferably, one group is hydroxy and the other is an amino, $C_{1-4}$alkylamino, cyclohexylamino, phenylamino or napthylamino group. The terms ortho and ortho', as used herein, mean the positions are one carbon atom removed from the carbon atom bound to the azo or azomethine linkage, whether carbocyclic, heterocyclic or aliphatic diazo or coupling components are involved. Particularly good results are obtained by reacting monoazo dyes of the formula

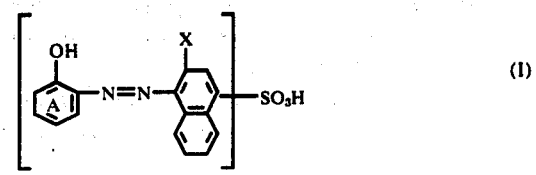

where X stands for hydroxyl or -NHR and R for hydrogen or a hydrocarbon radical, in particular phenyl, and where ring A and the naphthalene radical may be further substituted.

As is evident to those in the art, the sulpho groups of the complexes are usually in salt form.

The hydrocarbon radical in the foregoing formula is, for example, an unsubstituted or substituted alkyl, cycloalkyl or aryl radical, such as a straight or branched alkyl radical having 1 to 12, preferably 1 to 6 or optimally 1 to 4 carbon atoms, or alternatively a cyclohexyl, phenyl or naphthyl radical. If the selected radical is substituted, the preferred substituents are halogen atoms, hydroxyl or cyano groups, aryl radicals and the sulphonic acid group. For example, substituted alkyl embraces aralkyl radicals, e.g. benzyl radicals. The suitable alkoxy radicals may contain 1 to 6 or preferably 1, 2, 3 or 4 carbon atoms. Halogen may stand for bromine, fluorine or iodine or, more especially, for chlorine. Examples of suitable substituents on the naphthalene radical are hydroxyl, sulphonamide, acylamino groups, e.g. $CH_3$—CO—NH—, $CH_3SO_2NH$— and $C_6H_5CO$—NH—, and urethane groups such as $CH_3$—O—CO—NH—. The suitable substituents on ring A include halogen atoms and nitro, alkyl, alkoxy and sulphonic acid amide groups, of which the latter may be unsubstituted or substituted; sulfonic acid, monoalkyl or dialkyl, aryl (e.g. phenyl) and aralkyl (e.g. benzyl) amide groups may be mentioned as examples of substituted sulphonic acid amide groups.

Thus, among the metallizable dyes usable in the disclosed process are those of the formula

wherein
D is 2-hydroxyphenyl or substituted 2-hydroxyphenyl wherein each substituent is independently halo, nitro, alkyl, substituted alkyl, alkoxy, substituted alkoxy, sulfamoyl, alkylsulfamoyl, dialkylsulfamoyl, phenylsulfamoyl, carboxyphenylsulfamoyl or benzylsulfamoyl, and
K is 2-X-naphthyl-1 or substituted 2-X-naphthyl-1 wherein each substituent is independently hydroxy, sulfamoyl, alkylcarbonylamino, alkylsulfonylamino, benzamido or alkoxycarbonylamino, wherein X is hydroxy or —NHR,
 wherein R is hydrogen, alkyl, substituted alkyl, cyclohexyl, substituted cyclohexyl, phenyl, substituted phenyl, naphthyl or substituted naphthyl,
wherein each substituent of substituted alkyl, substituted alkoxy, substituted cyclohexyl, substituted phenyl and substituted naphthyl is independently halo, hydroxy, cyano, phenyl, naphthyl or alkoxy, each alkyl and alkyl radical of each substituted alkyl, alkylsulfamoyl, dialkylsulfamoyl, alkylcarbonylamino and alkylsulfonylamino independently has 1 to 12 carbon atoms, and each alkoxy and alkoxy radical of substituted alkoxy and alkoxycarbonylamino independently has 1 to 6 carbon atoms, and particularly the dyes of Formula III wherein
K is 2-X-naphthyl-1 or substituted 2-X-naphthyl-1 wherein each substituent is independently hydroxy, sulfamoyl, acetamido, methylsulfonylamino, benzamido or methoxycarbonylamino,
wherein X is —NHR',
wherein R' is phenyl or substituted phenyl.

For the disclosed process special preferance is given to monoazo dyes of the formula

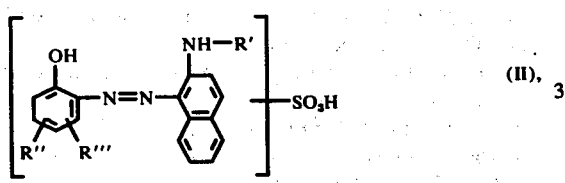

(II), where R' stands for a phenyl radical which may be substituted and R'' and R''' each stands for halogen, nitro, an alkyl or alkoxy radical which may be substituted or a sulphonic acid amide group.

Thus, among the monoazo dyes that are preferred for the disclosed process are those of the formula

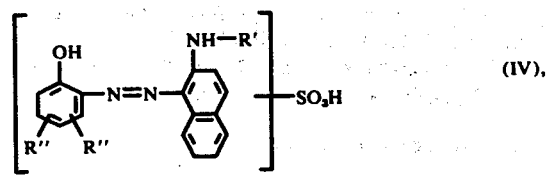

(IV), wherein
R' is phenyl or substituted phenyl wherein each substitutent is independently halo, hydroxy, cyano, phenyl, naphthyl or alkoxy, and
each R'' is independently halo, nitro, alkyl, substituted alkyl, alkoxy, substituted alkoxy or sulfamoyl, wherein each substituent of substituted alkyl and substituted alkoxy is independently halo, hydroxy, cyano, phenyl or naphthyl,
wherein each alkyl, alkoxy, alkyl chain of substituted alkyl and alkoxy chain of substituted alkoxy independently has 1 to 4 carbon atoms,
and those of the formula

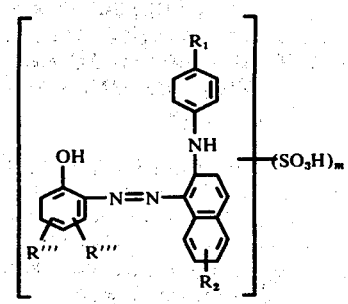

(V), wherein
$R_1$ is hydrogen, methoxy or sulfo,
$R_2$ is hydrogen or hydroxy,
each R''' is independently hydrogen, chloro or nitro, and
$m$ is 0 or 1,
with the proviso that $m$ is 0 when $R_1$ is sulfo and $m$ is 1 when $R_1$ is hydrogen or methoxy.

The alkali metal and ammonium nitrites are of major interest for the process, examples being lithium, sodium, potassium and ammonium nitrite. $NaNO_2$ has much to commend it.

The reaction of the starting dyes with a cobalt donor in the presence of nitrite can be carried out in aqueous medium, in a mixture of water and organic solvent or in an organic solvent alone. A suitable temperature range is about 0° C to about 60° C, the optimum range being 10°–30° C, and the reaction medium is expediently set in the acid region, i.e. at a pH from 3 to 7 or preferably pH 5 to 6.

Any of the cobalt compounds used for cobalt complex formation with metallisable azo compounds can be employed as cobalt yielding agents in the present process; cobaltous formate, acetate, nitrate and sulphate may be especially mentioned.

Cobalt complex formation is best carried out in the presence of 2 to 6 or preferably 3 to 4 gram equivalents of a nitrite per gram atom of cobalt. However, as little as one gram equivalent of nitrite per gram equivalent of cobalt may be employed if an oxidising agent is employed to convert the cobalt from the +2 to the +3 oxidation state. In comparison with the known methods of cobalt complex formation (cf. French Pat. Nos. 1,431,264, 1,466,877 and 1,476,587) the new process disclosed herein has the advantage that the resulting 1:1 cobalt complex compounds are of much greater purity and homogeneity; they are in fact virtually free from by-products.

These 1:1 cobalt complex compounds can, if desired, be employed as dyes in the form obtained, for example for the dyeing of natural and synthetic polyamide fibres and the coloration of plastics and surface coatings. Their high purity is particularly in evidence in the dyeing of natural and synthetic polyamide fibres and leather.

In comparison with the known method of reaction using ammonia or amines, the mode of operation with nitrites represents a considerable simplification and has the merit of being non-toxic, while the resulting 1:1 cobalt complexes show at least equally as high reactivity as the complexes known to date when employed for the formation of the corresponding 2:1 cobalt complex compounds.

A specific advantage of the pure 1:1 cobalt compounds so produced is that they can be reacted with metal-free monoazo or azomethine dyes bearing metallisable groups in the positions ortho and ortho' to an azo or azomethine group to yield a pure symmetrical or, in particular, a pure asymmetrical 2:1 cobalt complex dye. This reaction leads to homogeneous 2:1 cobalt complex dyes.

The metallisable compounds described in Swiss Pat. No. 476,812 may be cited to exemplify the metallisable azo dyes suitable for the production of 2:1 cobalt complexes from the 1:1 metal complex compounds.

The 1:1 cobalt complex compounds are readily soluble in organic solvents and are therefore suitable for the coloration of plastics and surface coatings.

In the following Examples the parts are by weight and the temperatures are in degrees centigrade.

EXAMPLE 1

A solution of 28 parts of cobaltous sulphate.7H$_2$O and 42 parts of sodium nitrite in 400 parts of water is prepared. At 10° 51 parts of the dye obtained by acid coupling of diazotised 2-amino-1-hydroxy-4,6-dinitrobenzene to 2-phenylaminoaphthalene-40'-sulphonic acid are added, whereupon the dye goes partly into solution. To complete dissolution 50 parts of dimethylformamide are added dropwise. The pH is maintained at 5.0–5.5 by adding hydrochloric acid. After approximately 2 hours the metallising reaction is complete and no further starting product is indicated. Salt is added to precipitate the 1:1 cobalt complex and it is isolated by filtration, washed with water and dried.

The metal complex dye thus produced dissolves in water and dyes natural and synthetic polyamide fibres in bluish-olive shades. The dyeings have good light and rubbing fastness, with comparably good fastness to wet treatments such as washing, water, sea water, milling and perspiration. It has the formula

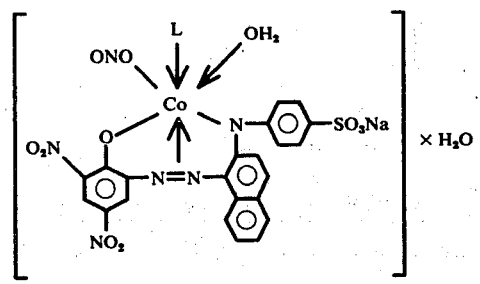

where L is mainly H$_2$O but also some ONO and $x$ is up to 3.

The dye is applied to wool, nylon and cellulose acetate and incorporated into paint media in accordance with the methods given in French Pat. No. 1,446,058.

EXAMPLE 2

28 Parts of cobaltous sulphate.7H$_2$O and 27.6 parts of sodium nitrite are dissolved in 300 parts of water. At 10° 47 parts of the dye formed by alkaline coupling of diazotised 2-amino-1-hydroxy-4-chlorobenzene to 2-phenylamino-5-hydroxynaphthalene-7-sulphonic acid are added, whereupon the dye goes partly into solution. 20 Parts of dimethylformamide are added dropwise and at the same time the pH is adjusted to 5 to 6, whereupon the dye gradually goes into solution. The temperature is increased to 20°–25° and the solution stirred for 20 hours, the pH being maintained throughout at a value between 5 and 6. After this time the entire amount of starting monoazo dye has reacted to form the 1:1 cobalt complex. The reaction solution is run into 1500 parts of a saturated sodium chloride solution to precipitate the product, which is filtered and washed with saturated sodium chloride solution. The crude 1:1 cobalt complex is dissolved in 1000 parts of water, the solution clarified by filtration and the complex precipitated again with sodium chloride, filtered and dried.

The cobalt complex dye thus produced is water soluble and gives dyeings of bordeaux shade on natural and synthetic polyamide fibres which have good light and wet fastness properties. It has the formula

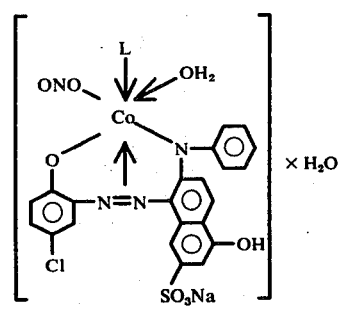

where L and x are as defined in Example 1.

EXAMPLE 3

28 Parts of cobaltous sulphate.7H$_2$O and 27.5 parts of sodium nitrite are dissolved in 300 parts of water. 34 Parts of the dye formed by alkaline coupling of diazotised 2-amino-1-hydroxybenzene-4-sulphonic acid amide to 2-hydroxynaphthalene are added to the solution at 10°. The dye is partially dissolved by the addition of 100 parts of alcohol. After adjustment of the pH to 5.0 the reaction mixture is raised to 40° in 1 hour with stirring and held at this temperature for 2 hours with constant stirring. On cooling to 20° stirring is continued for a further 20 hours at this temperature, after which time the end-point of metallisation is reached. The 1:1 cobalt complex is isolated as given in Example 2. It has the formula

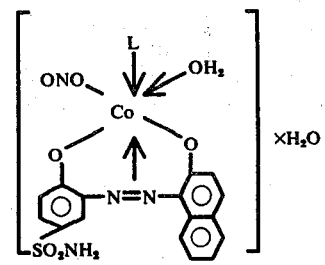

where L and x are as defined in Example 1.

Further examples 1:1 cobalt complexes conforming to this invention are specified in the following table.

| Expl. No. | Monoazo dye | Colour of 1:1 cobalt complex |
|---|---|---|
| 4 | 2-Amino-1-hydroxy-4,6-dichlorobenzene → 2-(4'-methoxyphenylamino)-5-hydroxynaphthalene-7-sulphonic acid | violet |
| 5 | 2-Amino-1-hydroxy-4,6-dinitrobenzene → 2-(4'-methoxyphenylamino)-5-hydroxynaphthalene-7-sulphonic acid | violet |
| 6 | 2-Amino-1-hydroxy-4-chlorobenzene → 2-(4'-methoxyphenylamino)-5-hydroxynaphthalene-7-sulphonic acid | bordeaux |
| 7 | 2-Amino-1-hydroxybenzene → 2-phenylamino-5-hydroxynaphthalene-7-sulphonic acid | bordeaux |
| 8 | 2-Amino-1-hydroxy-4,6-dinitrobenzene → 2-phenylaminonaphthalene-2'-sulphonic acid | olive |
| 9 | 2-Amino-1-hydroxy-5-nitrobenzene → 2-aminonaphthalene-6-sulphonic acid-2'-hydroxypropylamide | blue |
| 10 | 2-Amino-1-hydroxybenzene-4-sulphonic acid amide → 2-phenylaminonaphthalene | olive |
| 11 | 2-Amino-1-hydroxybenzene-4-sulphonic acid-2'-carboxyphenylamide → 2-phenylaminonaphthalene | blue |
| 12 | 2-Amino-1-hydroxy-4-chlorobenzene-6-sulphonic acid → 2-phenylaminonaphthalene | olive |
| 13 | 1-Amino-2-hydroxy-6-nitronaphthalene-4-sulphonic acid → 2-phenylaminonaphthalene | olive |
| 14 | 1-Amino-2-hydroxynaphthalene-4-sulphonic acid → 2-phenylaminonaphthalene | olive |
| 15 | 2-Amino-1-methoxybenzene-4-sulphonic acid → 2-hydroxynapththalene | bordeaux |
| 16 | 1-Amino-2-benzoic acid → 3-methyl-1-(4'-sulphophenyl)-5-pyrazolone | yellow |

The tabulated Examples 17 to 19 below define 1:1 cobalt complex compounds of metallisable azomethine dyes which are obtained by condensation of the corresponding amino and aldehyde components in ethanol at boiling temperature with subsequent cobalt complex formation. The condensation reaction is continued until no further starting amine is indicated. The metal-free azomethine dye is then precipitated with a saturated sodium chloride solution, filtered, washed and reacted as given in Examples 1 to 3 to yield the cobalt complex compound.

| Expl. No. | Azomethine dye | | Colour of 1:1 cobalt complex dye |
|---|---|---|---|
| | Amino component | Aldehyde component | |
| 17 | 2-amino-4-chloro-1-hydroxybenzene | 2-hydroxybenzaldehyde | yellow |
| 18 | 2-amino-4-nitro-1-hydroxybenzene | 2-hydroxynaphthaldehyde | red-orange |
| 19 | 2-amino-4-chloro-1-hydroxybenzene | 2-hydroxy-3,5-dichlorobenzaldehyde | yellow |

The use of the 1:1 cobalt complex compounds produced in accordance with this invention for the synthesis of 2:1 cobalt complex compounds is illustrated in the following Examples 20 and 21.

EXAMPLE 20

The 1:1 cobalt complex obtained with 51 parts of the monoazo dye 2-amino-1-hydroxy-4,6-dinitrobenzene → 2-phenylaminonaphthalene-4'-sulphonic acid after reaction as in Example 1, together with 37 parts of the dye formed by coupling diazotised 2-amino-1-hydroxybenzene-4-sulphonic acid amide to 3-methyl-1-phenyl-5-pyrazolone, are stirred into a mixture of 400 parts of water and 200 parts of alcohol and dissolved by the addition of sodium hydroxide solution at pH 12.0 and 20°. The solution is stirred for 3 hours, after which time the 1:1 cobalt complex is transformed completely into the 2:1 cobalt complex, a dye of olive shade. After distillation of the alcohol, the dye is salted out with sodium chloride, isolated by filtration, washed with a 10% sodium chloride solution and dried.

EXAMPLE 21

The procedure of Example 20 is employed, with the 37 parts of the monoazo dye formed by coupling diazotised 2-amino-1-hydroxybenzene-4-sulphonic acid to 3-methyl-1-phenyl-5-pyrazolone replaced by 24 parts of the azomethine dye produced by condensation of 2-amino-4-chloro-1-hydroxybenzene with 2-hydroxybenzaldehyde.

EXAMPLE 22

A solution of 28 parts of cobaltous sulphate.7H$_2$O and 42 parts of sodium nitrite in 400 parts of water is prepared. At 10°, 51 parts of the dye obtained by acid coupling of diazotised 2-amino-1-hydroxy-4,6-dinitrobenzene to 2-phenylaminonaphthalene-4'-sulphonic acid are added, whereupon the dye goes partly into solution. To completely dissolve the dye 50 parts of dimethylformamide are added. The pH is maintained at 5.0–5.5 by addition of hydrochloric acid. The metallisation reaction commences immediately and after approximately 2 hours is complete. Salt is added to precipitate the 1:1 cobalt complex and it is isolated by filtration, washed with water and dried.

By repeating the above procedure but employing appropriate starting materials 1:1 cobalt complexes of dyes obtained by coupling a. 2-amino-1-hydroxy-4,6-dinitrobenzene with 2-phenylaminonaphthalene-5-sulphonic acid,
b. 2-amino-1-hydroxy-4,6-dinitrobenzene with 1-aminonaphthalene-4-sulphonic acid,
c. 2-amino-4-chloro-1-hydroxy-5-nitrobenzene with 2-phenylaminonaphthalene-4'-sulphonic acid,
d. 2-amino-4,6-dichloro-1-hydroxybenzene with 2-phenylaminonaphthalene-3'-sulphonic acid,
e. 2-amino-5-chloro-1-hydroxy-4-methoxybenzene with 2-phenylaminonaphthalene-6-sulphonic acid,
f. 2-amino-1-hydroxy-4-chlorobenzene-6-sulphonic acid with 5-amino-3-methyl-1-phenylpyrazole,
g. 2-amino-1-hydroxy-5-nitrobenzene with 5-amino-3-methyl-1-phenylpyrazole,
h. 2-amino-1-hydroxy-4-nitrobenzene-6-sulphonic acid with 2-aminonaphthalene-6-sulphonic acid,
i. 2-amino-1-hydroxy-4,6-dinitrobenzene with 2-phenylaminonaphthalene,
j. 2-amino-1-hydroxy-4,6-dinitrobenzene with 1-aminonaphthalene-4,6-disulphonic acid

What is claimed is:

1. A process for the synthesis of a 1:1 complex of cobalt and an azo or azomethine dye having metallizable substituents in ortho and ortho' positions relative to an azo or azomethine group, said complex containing a nitrite ion bound to the cobalt atom, which process comprises reacting at a pH of 3 to 7 an azo or azomethine dye having said metallizable substituents with cobalt ion and nitrite ion, said cobalt ion and nitrite ion being present in amounts sufficient to produce a 1:1 complex of cobalt and said dye containing a nitrite ion bound to the cobalt atom, whereby such a complex is produced.

2. A process according to claim 1, wherein a reaction temperature of 0° to 60° C is employed.
3. A process according to claim 1, wherein 2 to 6 grams equivalents of nitrite ion per gram atom of cobalt ion are employed.
4. A process according to claim 2, wherein 2 to 6 gram equivalents of nitrite ion per gram atom of cobalt ion are employed.
5. A process according to claim 3, wherein an alkali metal nitrite or ammonium nitrite is employed.
6. A process according to claim 5, wherein sodium nitrite is employed.
7. A process according to claim 4, wherein an alkali metal nitrite or ammonium nitrite is employed.
8. A process according to claim 7, wherein sodium nitrite is employed.
9. A process according to claim 4 wherein said dye is a dye of the formula

wherein
D is 2-hydroxyphenyl or substituted 2-hydroxyphenyl wherein each substituent is independently halo, nitro, alkyl, substituted alkyl, alkoxy, substituted alkoxy, sulfamoyl, alkylsulfamoyl, dialkylsulfamoyl, phenylsulfamoyl, carboxyphenylsulfamoyl or benzylsulfamoyl, and
K is 2-X-naphthyl-1 or substituted 2-X-naphthyl-1 wherein each substituent is independently hydroxy, sulfamoyl, alkylcarbonylamino, alkylsulfonylamino, benzamido or alkoxycarbonylamino,
wherein X is hydroxy or —NHR,
wherein R is hydrogen, alkyl, substituted alkyl, cyclohexyl, substituted cyclohexyl, phenyl, substituted phenyl, naphthyl or substituted naphthyl,
wherein
each substituent of substituted alkyl, substituted alkoxy, substituted cyclohexyl, substituted phenyl and substituted naphthyl is independently halo, hydroxy, cyano, phenyl, naphthyl or alkoxy,
each halo is independently fluoro, chloro, bromo or iodo,
each alkyl and alkyl radical of each substituted alkyl, alkylsulfamoyl, dialkylsulfamoyl, alkylcarbonylamino and alkylsulfonylamino independently has 1 to 12 carbon atoms, and
each alkoxy and alkoxy radical of substituted alkoxy and alkoxycarbonylamino independently has 1 to 6 carbon atoms.

10. A process according to claim 9 wherein
is 2-hydroxyphenyl or substituted 2-hydroxyphenyl wherein each substituent is independently halo, nitro, alkyl, alkoxy, sulfamoyl, alkylsulfamoyl, dialkylsulfamoyl, phenylsulfamoyl or benzylsulfamoyl and
K is 2-X-naphthyl-1 or substituted 2-X-naphthyl-1 wherein each substituent is independently hydroxy, sulfamoyl, acetamido, methylsulfonylamino, benzamido or methoxycarbonylamino,
wherein X is —NHR', wherein R' is phenyl or substituted phenyl.

11. A process according to claim 9 wherein said dye is a dye of the formula

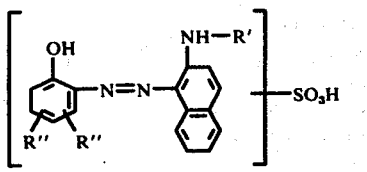

wherein
R' is phenyl or substituted phenyl wherein each substitutent is independently halo, hydroxy, cyano, phenyl, naphthyl or alkoxy, and
each R'' is independently halo, nitro, alkyl, substituted alkyl, alkoxy, substituted alkoxy or sulfamoyl, wherein each substituent of substituted alkyl and substituted alkoxy is independently halo, hydroxy, cyano, phenyl or naphthyl,
wherein each alkyl, alkoxy, alkyl chain of substituted alkyl and alkoxy chain of substituted alkoxy independently has 1 to 4 carbon atoms.

12. A process according to claim 10 wherein said dye is a dye of the formula

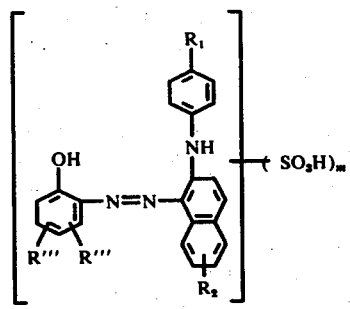

wherein
$R_1$ is hydrogen, methoxy or sulfo,
$R_2$ is hydrogen or hydroxy,
each R''' is independently hydrogen, chloro or nitro, and $m$ is 0 or 1,
with the proviso that $m$ is 0 when $R_1$ is sulfo and $m$ is 1 when $R_1$ is hydrogen or methoxy.

13. A process according to claim 12 comprising reacting in a solvent a dye of the formula

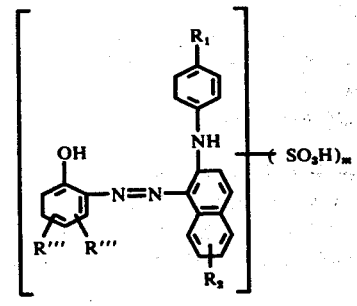

wherein
$R_1$ is hydrogen, methoxy or sulfo,
$R_2$ is hydrogen or hydroxy,
each R''' is independently hydrogen, chloro or nitro, and
$m$ is 0 or 1,
with the proviso that $m$ is 0 when $R_1$ is sulfo and $m$ is 1 when $R_1$ is hydrogen or methoxy,
with about 1 molar equivalent of cobaltous formate, acetate, or sulfate, or a hydrate thereof, and about 2 to 6 gram equivalents of lithium, sodium, potassium or ammonium nitrite per gram atom of cobalt ion at a temperature of 0° to 60° C. and at a pH of 3 to 7.

14. A process according to claim 1 wherein one of said metallizable substituents is hydroxy and the other is —$NH_2$, alkylamino of 1 to 4 carbon atoms, cyclohexylamino, phenylamino or naphthylamino.

15. In a process for the synthesis of a 1:1 complex of cobalt and an azo or azomethine dye having metallizable substituents in ortho and ortho' positions relative to an azo or azomethine group comprising reacting an azo or azomethine dye having metallizable substituents in ortho and ortho' positions relative to an azo or azomethine group with cobalt ions, the improvement which comprises carrying out said reaction in the presence of nitrite ions, whereby a nitrite ion-containing 1:1 complex of cobalt and said azo or azomethine dye is obtained.

16. In a process for the synthesis of a 1:1 complex of cobalt and a metallizable monoazo or azomethine dye comprising reacting in a solvent a metallizable monoazo or azomethine dye with cobalt ions at a temperature of about 0° to about 60° C., the improvement which comprises carrying out said reaction in the presence of nitrite ions at a pH of 3 to 7, whereby a nitrite ion-containing 1:1 complex of cobalt and said metallizable monoazo or azomethine dye is obtained.

17. A process according to claim 16 wherein said reaction is carried out in the presence of lithium nitrite, sodium nitrite, potassium nitrite or ammonium nitrite.

18. A process according to claim 17 wherein said reaction is carried out in the presence of sodium nitrite.

19. A process according to claim 17 wherein said reaction is carried out in the presence of 2 to 6 gram equivalents of nitrite ion per gram atom of cobalt ion.

20. A process according to claim 19 wherein said metallizable monoazo or azomethine dye contains one sulfo group.

21. A 1:1 complex of cobalt and an azo or azomethine dye having metallizable substituents in ortho and ortho' positions relative to one azo or azomethine group, said complex containing a nitrite ion bound to the cobalt atom, produced according to the process of claim 1.

22. A 1:1 complex of cobalt and an azo or azomethine dye having metallizable substituents in ortho and ortho' positions relative to one azo or azomethine group, said complex containing a nitrite ion bound to the cobalt atom, whenever produced according to the process of claim 13.

23. A 1:1 complex of cobalt and a metallizable dye containing a nitrite ion bound to the cobalt atom wherein said metallizable dye is a dye of the formula

wherein
D is 2-hydroxyphenyl or substituted 2-hydroxyphenyl wherein each substituent is independently halo, nitro, alkyl, substituted alkyl, alkoxy, substituted alkoxy, sulfamoyl, alkylsulfamoyl, dialkylsulfamoyl, phenylsulfamoyl, carboxyphenylsulfamoyl or benzylsulfamoyl, and
K is 2-X-naphthyl-1 or substituted 2-X-naphthyl-1 wherein each substituent is independently hydroxy, sulfamoyl, alkylcarbonylamino, alkylsulfonylamino, benzamido or alkoxycarbonylamino,
wherein X is hydroxy or —NHR,
wherein R is hydrogen, alkyl, substituted alkyl, cyclohexyl, substituted cyclohexyl, phenyl, substituted phenyl, naphthyl or substituted naphthyl,
wherein
each substituent of substituted alkyl, substituted alkoxy, substituted cyclohexyl, substituted phenyl and substituted naphthyl is independently halo, hydroxy, cyano, phenyl, naphthyl or alkoxy,
each halo is independently fluoro, chloro, bromo or iodo,
each alkyl and alkyl radical of each substituted alkyl, alkylsulfamoyl, dialkylsulfamoyl, alkylcarbonylamino and alkylsulfonylamino independently has 1 to 12 carbon atoms, and
each alkoxy and alkoxy radical of substituted alkoxy and alkoxycarbonylamino independently has 1 to 6 carbon atoms.

24. A 1:1 complex according to claim 23 wherein said metallizable dye is a dye of the formula

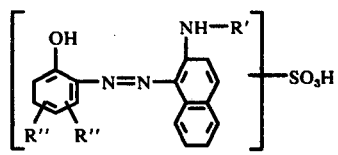

wherein
R' is phenyl or substituted phenyl wherein each substituent is independently halo, hydroxy, cyano, phenyl, naphthyl or alkoxy, and
each R'' is independently halo, nitro, alkyl, substituted alkyl, alkoxy, substituted alkoxy or sulfamoyl, wherein each substituent of substituted alkyl and substituted alkoxy is independently halo, hydroxy, cyano, phenyl or naphthyl,
wherein each alkyl, alkoxy, alkyl chain of substituted alkyl and alkoxy chain of substituted alkoxy independently has 1 to 4 carbon atoms.

25. A 1:1 complex according to claim 23 wherein said metallizable dye is a dye of the formula

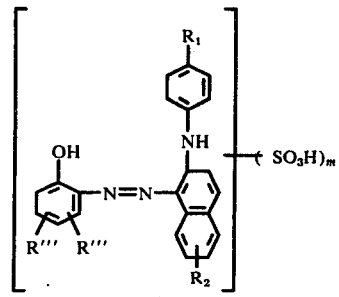

wherein
$R_1$ is hydrogen, methoxy or sulfo,
$R_2$ is hydrogen or hydroxy,
each R''' is independently hydrogen, chloro or nitro, and
$m$ is 0 or 1,
with the proviso that $m$ is 0 when $R_1$ is sulfo and $m$ is 1 when $R_1$ is hydrogen or methoxy.

26. The 1:1 complex according to claim 25, wherein said metallizable dye is the dye of the formula

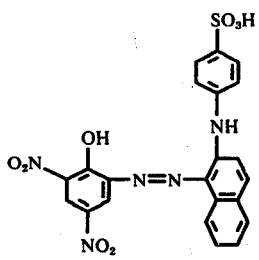

27. A process according to claim 13, wherein said dye is the dye of the formula

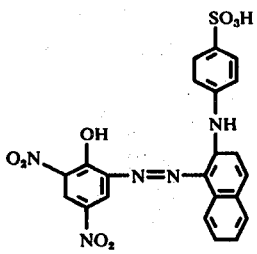

* * * * *